United States Patent
Tate et al.

(10) Patent No.: US 12,296,287 B2
(45) Date of Patent: May 13, 2025

(54) ENHANCED FUEL WATER SEPARATION USING STRUCTURAL EMBOSSING

(71) Applicant: Parker-Hannifin Corporation, Cleveland, OH (US)

(72) Inventors: Jason L Tate, Thompsons Station, TN (US); Sreevalli Bokka, Akron, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 388 days.

(21) Appl. No.: 17/678,171

(22) Filed: Feb. 23, 2022

(65) Prior Publication Data

US 2022/0176277 A1    Jun. 9, 2022

Related U.S. Application Data

(63) Continuation of application No. PCT/US2020/047438, filed on Aug. 21, 2020.

(60) Provisional application No. 62/891,458, filed on Aug. 26, 2019.

(51) Int. Cl.
*B01D 29/21* (2006.01)
*B01D 17/04* (2006.01)

(52) U.S. Cl.
CPC ........... *B01D 29/21* (2013.01); *B01D 17/045* (2013.01); *B01D 2201/12* (2013.01); *B01D 2201/32* (2013.01)

(58) Field of Classification Search
CPC .. B01D 29/21; B01D 17/045; B01D 2201/12; B01D 2201/32; B01D 17/06; B01D 17/10; B01D 36/006; B01D 2201/127; B01D 29/333; B01D 27/06; B01D 35/005; B01D 36/003
See application file for complete search history.

(56) References Cited

U.S. PATENT DOCUMENTS

| | | |
|---|---|---|
| 3,058,594 A | 10/1962 | Hultgren |
| 3,198,336 A | 8/1965 | Hyslop |
| 5,064,598 A | 11/1991 | Seiler |
| 7,081,291 B2 | 7/2006 | Courtoy et al. |
| 7,425,227 B1 | 9/2008 | Hutchison et al. |
| 9,486,719 B2 | 11/2016 | Walz et al. |
| 10,343,103 B2 | 7/2019 | Ouyang et al. |
| 2003/0230061 A1 | 12/2003 | Kubokawa et al. |
| 2012/0261331 A1 | 10/2012 | Ter Horst et al. |
| 2016/0016106 A1 | 1/2016 | Bowerman et al. |
| 2018/0056226 A1 | 3/2018 | Buettner, III et al. |
| 2018/0200645 A1 | 7/2018 | Krasinski et al. |

(Continued)

FOREIGN PATENT DOCUMENTS

| | | | |
|---|---|---|---|
| CN | 107106944 A | 8/2017 | |
| CN | 107510990 A | 12/2017 | |
| CN | 109890666 A * | 6/2019 | ......... B01D 46/0005 |

(Continued)

*Primary Examiner* — Waqaas Ali
(74) *Attorney, Agent, or Firm* — Reinhart Boerner Van Deuren P.C.

(57) ABSTRACT

A filter media, filter element, filter system and methods are provided. The filter media provides improved filter characteristics including water separation efficiency. The filter media may include one or more of increased surface roughness and/or embossments. The filter media may be provided by pleated filter media.

14 Claims, 13 Drawing Sheets

(56) References Cited

U.S. PATENT DOCUMENTS

2018/0214806 A1    8/2018   Tate et al.

FOREIGN PATENT DOCUMENTS

| GB | 888205 B2 | 1/1962 |
| JP | 2010201329 A | 9/2010 |
| JP | 2012011345 A | 1/2012 |
| JP | 2013096368 A | 5/2013 |
| JP | 4503897 B2 | 4/2020 |
| WO | WO 2001/02093 A2 | 1/2001 |
| WO | WO 2014/173709 A1 | 10/2014 |
| WO | WO 2018/075385 A1 | 4/2018 |

* cited by examiner

ENHANCED FUEL WATER SEPARATION USING STRUCTURAL EMBOSSING

CROSS-REFERENCE TO RELATED PATENT APPLICATIONS

This patent application is a continuation of U.S. PCT Patent Application No. PCT/US2020/047438, filed Aug. 21, 2020, which claims the benefit of U.S. Provisional Patent Application No. 62/891,458, filed Aug. 26, 2019, the entire teachings and disclosure of which are incorporated herein by reference thereto.

FIELD OF THE INVENTION

This invention generally relates to filtration, and more specifically to coalescing filtration systems used for example in hydrocarbon fuel systems and applications.

BACKGROUND OF THE INVENTION

Coalescing filtration systems are often employed as the first stage in filter/separator vessels for hydrocarbon fluids e.g. fuels. Such systems filter out particulate contaminants and coalesce (combine) highly dispersed, emulsified water particles into larger water drops. These larger water drops are then collected and removed from the system.

A variety of methodologies may be employed to achieve such coalescence. For example, small droplets of water entrained in the fuel can contact and adhere to strands of filter media (for example, fiberglass). The operating pressure in the system and fluid flow pushes the droplets along these strands until they reach an intersection of strands where they combine with other droplets, and hence coalesce, into large drops.

Embossed patterns are often pressed into the filter media. These patterns often run parallel to the machine direction causing the fluid flow to be parallel to the embossment leading to a lower embossment contact area with the water droplets. For example, in a radial flow filter using a tube of filter media that has a vertical central axis, the elongated embossments will typically have the elongated axis parallel to the radius of the tube of filter media that is perpendicular to the central axis. This elongated axis is also then generally parallel to the flow of fluid through the block of filter media from an upstream face of the block of filter media to a downstream face of the block of filter media.

In use, coalesced water droplets run down along the filter media, e.g. parallel to the central axis of the tube of filter media, to a water collection bowl. Unfortunately, this causes the water concentration to continually increase when moving from the top of the tube of filter media to the bottom of the tube of filter media leading to a high-water concentration at the bottom of the element before the water droplets get collected in the water collection bowl.

While the above systems have been found satisfactory, there remains room for improvement. Indeed, there is a constant desire to reduce the pressure drop across a filter element, with such pressure drop typically being driven by the filtration media used in the filter element. There is thus a need in the art for a filtration element and associated filtration media that exhibits a reduced pressure differential while still providing the advantages of fuel water separation, i.e. water coalescence.

SUMMARY

The present application provides such a filter element and associated filter media as well as methods of forming the same. The present application provides improvements over the current state of the art.

In one embodiment a pleated filter element including filtration media having pleat flanks with structural embossments is provided. The filtration media is pleated into a plurality of longitudinally extending adjacent opposed successive pleat flanks of selected depth and spacing between successive pleat flanks to provide spaced upstream and downstream filter surfaces. The adjacent pleat flanks are connected by corresponding fold lines. Each of said successive pleat flanks has a first side and a second side. A plurality of structural embossments are formed in at least one of the first and second sides on adjacent flanks. The structural embossments have at least one of different geometries between adjacent structural embossments on a flank; different angles of projection along the at least one of the first and second sides relative to the longitudinal axis of the filtration media between adjacent embossments on a flank; a non-polygonal configuration; a tear drop geometry; and/or a first end and a second end defining an embossment axis extending between the first end and the second end with the embossment axis extending at a non-parallel and non-perpendicular orientation relative to the fold lines connected to the corresponding pleat flank.

In one example, pleated filter element comprising pleated filter media having a plurality of pleat flanks and a plurality of structural embossments is provided. The pleated filter media has a first side forming an upstream surface and a second side forming a downstream surface. The pleated filter media includes a plurality of pleat flanks and a plurality of folds. Adjacent pleat flanks are connected by a corresponding one of the plurality of folds. The plurality of structural embossments are formed in at least one of the first and second sides of the pleat flanks. Each structural embossment has a first end and a second end that defines an embossment axis of the structural embossment. The embossment axis extends at a non-parallel and non-perpendicular orientation relative to the folds connected to the corresponding pleat flank.

In one example, the pleated filter media forms a tube of filter media defining a longitudinal central axis. The folds extend parallel to the longitudinal central axis. Each structural embossment is elongated along the structural embossment's embossment axis.

In one example, a first structural embossment of the plurality of structural embossments and a second structural embossment of the plurality of structural embossments are formed in a first pleat flank of the plurality pleat flanks. The embossment axis of the first structural embossment extends at a different angle than the embossment axis of the second structural embossment.

In one example, the pleated filter media has a gravitational top and a gravitational bottom. The gravitational top is vertically above the gravitational bottom (e.g. in use). The folds extend between the gravitational top and the gravitation bottom. The embossment axis of the first structural embossment is less aligned with gravity than the embossment axis of the second structural embossment. The first structural embossment is located closer to the gravitational top than the second structural embossment.

In one example, the pleated filter media forms a block of filter media that defines an upstream face and a downstream face. The block of filter media has a flow direction through which fluid to be filtered flows from the upstream face to the downstream face. The flow direction is generally perpendicular to the plurality of folds.

In one example, the embossment axes are angled relative to the folds such that when moving in the flow direction from the upstream face towards the downstream face, the embossment axes move upward towards the gravitational top of the pleated filter media.

In one example, a third structural embossment of the plurality of structural embossments is formed in a second pleat flank of the plurality of pleat flanks. A first fold of the plurality of folds is formed between the first and second pleat flanks. The first end of the third structural embossment is positioned axially between the first ends of the first and second structural embossments along the first fold. The first end of the second structural embossment being positioned axially between the first and second ends of the third structural embossment.

In one example, the first, second, and third structural embossments form a shingled orientation, particularly when viewed in the fluid flow direction.

In one example, the plurality of structural embossments each have a width that is generally perpendicular to the embossment axis. The width increases when moving from the first end toward the second end.

In one example, the depth/height of the structural embossments increases when moving from the first end toward the second end.

In one example, the first and second structural embossments form a projection on the first side of the pleated filter media and a depression on the second side of the pleated filter media. The third structural embossment forms a projection on the second side of the second pleat flank and a depression on the first side of the second pleat flank.

In one example, the filtration media is formed into a tube of pleated filter media defining a central longitudinal axis. Each of the structural embossments forms a projection on one of the first and second sides of the corresponding pleat flank and a depression in the other one of the first and second sides of the corresponding pleat flank. A width of the projection and depth of the depression measured generally perpendicular to the corresponding axis of the structural embossment increases when moving radially away from the central longitudinal axis of the tube of pleated filter media and along the embossment axis.

In one example, a width of the projection and depth of the depression measured generally perpendicular to the corresponding axis of the structural embossment increases when moving radially away from the central longitudinal axis of the tube of pleated filter media and along the embossment axis.

In one example, the pleated filter media is formed into a tube of pleated filter media. The tube of pleated filter media defines a central longitudinal axis. The tube of pleated filter media and is configured for fluid to be filtered to flow radially through the tube of pleated filter media as the fluid is filtered. Water that is separated moves generally parallel (or more parallel) to the central longitudinal axis. The tube of pleated filter media has a gravitational top and a gravitational bottom. The gravitational top is vertically above the gravitational bottom. The central longitudinal axis and folds extend between the gravitational top and the gravitation bottom. The embossment axis of the structural embossments is oriented relative to the longitudinal axis such that when moving along the embossment axis towards the gravitation bottom. The embossment axis moves radially outward and away from the longitudinal axis. However, other embodiments may have an opposite orientation.

In one embodiment, a method of making a filter element as outlined above is provided. The method includes providing filter media; embossing the filter media with a plurality of structural embossments; and folding the filter media about a plurality of folds to form a plurality of pleat flanks.

In one embodiment, a method of filtering water from a flow of fuel is provided. The method includes passing the flow of fuel through the filter media of the filter element as the fuel flows from an inlet of the filter element to an outlet of the filter element.

In one embodiment, a filtration system including a filter head, a housing and filter element as outlined above is provided. The filter head has an inlet and an outlet. The housing defines a sump region. A filter element as outlined above is positioned within the housing vertically above, at least in part, the sump region and fluidly interposed between the inlet and outlet.

In one embodiment, a method of making filter media is provided. The method includes providing a layer of filtration media having a surface with a predetermined roughness. The method includes contacting the surface of the media with a device having a selected roughness to impart a greater roughness to the surface of the media than the predetermined roughness.

The device may be a roller a plate, a belt or other structure for imparting enhanced surface roughness. The device may also include structure for forming structural embossments.

In one embodiment, the method includes the step of compressing the media with the device. This can form the enhanced surface roughness or the structural embossments.

In one embodiment, the method includes the step of pleating the media after the media is contacted with the device.

In one embodiment, the method includes the step of forming structural embossments in the surface of the media layer.

In one embodiment, the step of pleating the media includes forming fold lines between adjacent pleat panels. The method includes forming a plurality of the structural embossments that are elongated such that each of the plurality of the structural embossments has a first end and a second end defining an embossment axis extending between the first end and the second end. The embossment axis extends at a non-parallel and non-perpendicular orientation relative to the fold lines.

In one embodiment, a first structural embossment and a second structural embossment of the plurality of structural embossments are formed in a first pleat panel. The embossment axis of the first structural embossment extends at a different angle than the embossment axis of the second structural embossment relative to the fold line.

In one embodiment, the filter element has a gravitational top and a gravitational bottom. The gravitational top is vertically above the gravitational bottom. The embossment axis of the first structural embossment is less aligned with gravity than the embossment axis of the second structural embossment.

In one embodiment, a third structural embossment of the plurality of structural embossments is formed in a second pleat panel. The fold line is formed between the first and second pleat panels. The first end of the third structural embossment is positioned axially between the first ends of the first and second structural embossments along the fold line and the first end of the second structural embossment is positioned axially between the first and second ends of the third structural embossment.

In one embodiment, the plurality of structural embossments each have a width that is generally perpendicular to the embossment axis. The width increases when moving from the first end toward the second end. In some embodiments, this will be in a radially inward direction when the filter media is formed into a tube of pleated filter media. In other embodiments, this may simply be in a generally downstream direction e.g. from an upstream face to a downstream face of the filter media pack, such as in a panel filter element.

In one embodiment, the first and second structural embossments form a projection on a first side of the layer of filter media and a depression on the second side of the filter media. The third structural embossment forms a projection on the second side of the filter media and a recess on the first side of the filter media.

In one embodiment, the step of contacting the surface of the media with a device having a selected roughness to impart a greater roughness to the surface of the media than the predetermined roughness occurs on at least 80% and more preferably at least 90% of the filter media that does not include structural embossments.

In one embodiment, at least 95% of the surface of the filter media has been manipulated to include at least one of an increased surface roughness, a fold line and/or a structural embossment.

In one embodiment, the roller or plate has a surface roughness of at least 35µ and more preferably at least 190µ.

In one embodiment, the enhance surface roughness of the filter media is 20µ and more preferably at least 100µ.

In one embodiment, the step of contacting the surface of the media with a device having a selected roughness to impart a greater roughness to the surface of the media than the predetermined roughness is performed without removing material of the filter media.

In one embodiment, the step of contacting the surface of the media with a device having a selected roughness to impart a greater roughness to the surface of the media than the predetermined roughness is performed by compacting the filter media to form the greater roughness.

In one embodiment, the surface of the layer of filter media is an upstream surface of the layer of filter media that is an exposed surface.

In one embodiment, the layer of filter media is a pre-laminated media formed from a plurality of media layers. The step of contacting the surface of the media with a device having a selected roughness to impart a greater roughness to the surface of the media than the predetermined roughness does not simultaneously secure the plurality of media layers to form the layer of filter media.

In a particular implementation, the filter media is unwound from a roll of filter media in the laminated state prior to performing any surface roughness enhancement processes.

In one embodiment, the surface is not subsequently coated or covered after the step of contacting the surface of the media with a device having a selected roughness to impart a greater roughness to the surface of the media than the predetermined roughness.

In one embodiment, the surface roughness of the filter media layer has a contact angle measured using a Goniometer using water of between 130 degrees and 140 degrees and preferably at least 132 degrees.

In one embodiment, a filter element is provided. The filter element includes a pleated filter media pack formed from a layer of filtration media. The layer of filtration media forms a plurality of pleat panels formed by a plurality of fold lines. The filtration media has an upstream surface and a downstream surface. The upstream surface is compressed to have a desired surface roughness.

In one embodiment, the surface roughness of the upstream surface is greater than the surface roughness of the downstream surface.

In one embodiment, the upstream surface of the layer of filtration media is exposed such that fluid to be filtered first contacts the upstream surface of the layer of filtration media. As such, the surface that provides the desired roughness is not located between different layers of filter media. Further, the crevices or voids that form the surface roughness are not filled with other material.

In one embodiment, the layer of filtration media includes structural embossments in the upstream surface of the media layer.

In one embodiment, a plurality of the structural embossments are elongated such that each of the plurality of the structural embossments has a first end and a second end defining an embossment axis extending between the first end and the second end. The embossment axis extends at a non-parallel and non-perpendicular orientation relative to the fold lines.

In one embodiment, a first structural embossment and a second structural embossment of the plurality of structural embossments are formed in a first pleat panel. The embossment axis of the first structural embossment extending at a different angle than the embossment axis of the second structural embossment relative to the fold line.

In one embodiment, the filter element has a gravitational top and a gravitational bottom, the gravitational top being vertically above the gravitational bottom. The embossment axis of the first structural embossment is less aligned with gravity than the embossment axis of the second structural embossment. The first structural embossment being vertically above the second structural embossment.

In one embodiment, a third structural embossment of the plurality of structural embossments is formed in a second pleat panel. The fold line is formed between the first and second pleat panels. The first end of the third structural embossment is positioned axially between the first ends of the first and second structural embossments along the fold line and the first end of the second structural embossment is positioned axially between the first and second ends of the third structural embossment.

In one embodiment, the first, second and third embossments are positioned between upstream fold lines and downstream fold lines (e.g. radially outer fold lines and radially inner fold lines in a cylindrical element).

In one embodiment, the first, second and third embossments are positioned at a same location between the upstream and downstream fold lines.

In one embodiment, the first, second, and third embossments are axially offset from one another along the fold lines.

In one embodiment, the plurality of structural embossments each have a width that is generally perpendicular to the embossment axis. The width increasing when moving from the first end toward the second end. In one particular embodiment, this increase in width occurs when moving towards the downstream fold lines (e.g. radially inward in a cylindrical filter element or through the media pack when moving from an upstream face towards a downstream face of a panel filter element).

In one embodiment, the first and second structural embossments form a projection on a first side of the layer of filter media and a depression on the second side of the filter media. The third structural embossment forms a projection on the second side of the filter media and a recess on the first side of the filter media.

In one embodiment, at least 80% and more preferably at least 90% of the filter media that does not include structural embossments has a surface roughness that is greater than the surface roughness of the structural embossments.

In one embodiment, at least 95% of the surface of the filter media has been manipulated to include at least one of an increased surface roughness, a fold line and/or a structural embossment.

In one embodiment, the surface roughness of the upstream surface is at least 116μ which is equivalent to that of 120 grit sand paper and more preferably at least 190μ which is equivalent to that of 80 grit sand paper and even more preferably at least 425μ which is equivalent to 40 grit sand paper.

In one embodiment, the surface roughness of the upstream surface is at least equivalent to that of 120 grit sand paper and more preferably at least equivalent to that of 80 grit sand paper and even more preferably at least equivalent to 40 grit sand paper.

In one embodiment, the surface roughness of the upstream surface has been manipulated to be at least 50% greater than in an unmanipulated state, more preferably at least 100% greater than in an unmanipulated state, and even more preferably at least 400% greater than in an unmanipulated state.

In one embodiment, the surface roughness of the upstream face of the layer of filter media has been provided by compressing the upstream face of the layer of filtration media and not by removal of material from the upstream face.

In one embodiment, the upstream surface of the layer of filtration media is an exposed surface and the voids in the upstream surface forming the surface roughness are not filled with or covered by other material. This does not include potential overlap of adjacent pleat panels once the filter media is folded about the pleat folds.

In one embodiment, the layer of filtration media is a pre-laminated media formed from a plurality of media layers secured to one another independent of the structures of the filtration media providing the surface roughness of the upstream face.

In one embodiment, the surface roughness of the filtration media layer has a contact angle measured using a goniometer using water of between 130 degrees and 140 degrees and preferably at least 132 degrees.

In an embodiment, a method of filtering water from a flow of fuel includes passing the flow of fuel through the filtration media of a filter element according to any one of the embodiments outlined above as the fuel flows from an inlet of the filter element to an outlet of the filter element.

In an embodiment, a filtration system including a filter head having an inlet and an outlet; a housing, the housing defining a sump region; and a filter element according to any one of the prior embodiments is provided. The filter element is positioned within the housing vertically above, at least in part, the sump region and fluidly interposed between the inlet and outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
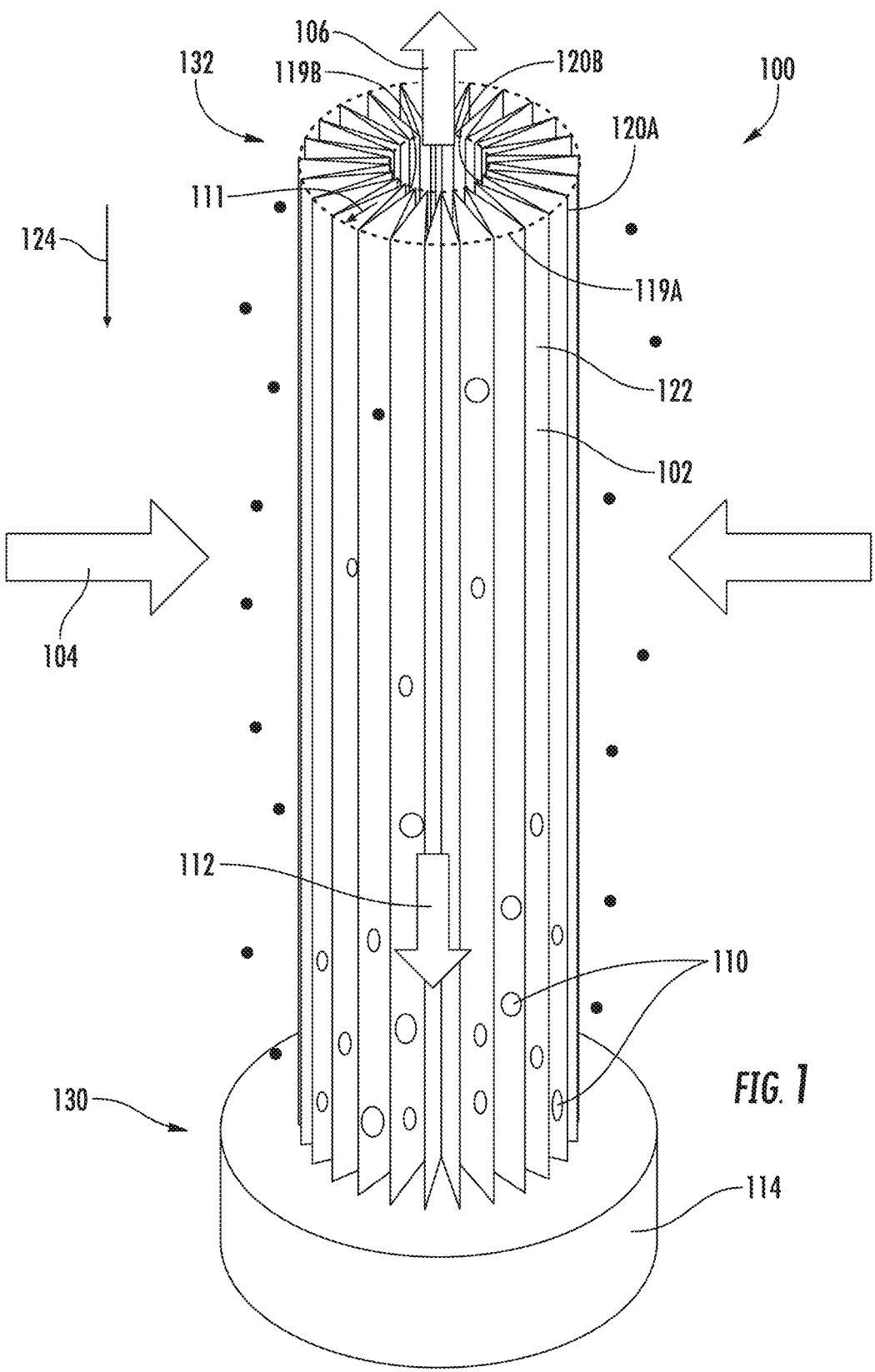
FIG. 1 is a simplified illustration of a filter element.

FIG. 1 illustrates a simplified filter element 100 incorporating the teachings of the present application. The filter element 100 includes pleated filter media 102 (also referred to as "filtration media") that is formed into a block of pleated filter media and particularly a cylindrical tube. While this embodiment illustrates the pleated filter media 102 in the cylindrical tube, other embodiments according to the present teachings could form the filter media in to a block of filter media that is in the form of a flat panel of filter media.

Filter element 100 finds particular benefit in filtering water from a flow fluid, such as a flow of fuel. The filter element 100 may also filter particulate matter from the flow fluid.

Dirty fluid enters the filter element 100 through one or more inlets, illustrated by arrows 104. The dirty fluid flows through the filter media 102 from an upstream side/face (radially outer side in the illustrated cylindrical tube of filter media) to a downstream side/face (radially inner side in the illustrated cylindrical tube of filter media) as the fluid flow through the filter media 102. After passing though the filter media 102, the cleaned fluid flows through one or more outlets, illustrated by arrow 106.

The filter media 102 is preferably configured to coalesce water entrained within the unfiltered fluid such that coalesced water droplets 110 will be separated from the fluid. The coalesced water droplets 110 will flow, illustrated by arrow 112 to a water sump 114 or other collection area. The flow of water droplets 110 is generally parallel to gravity (illustrated by arrow 124).

Figure 13:
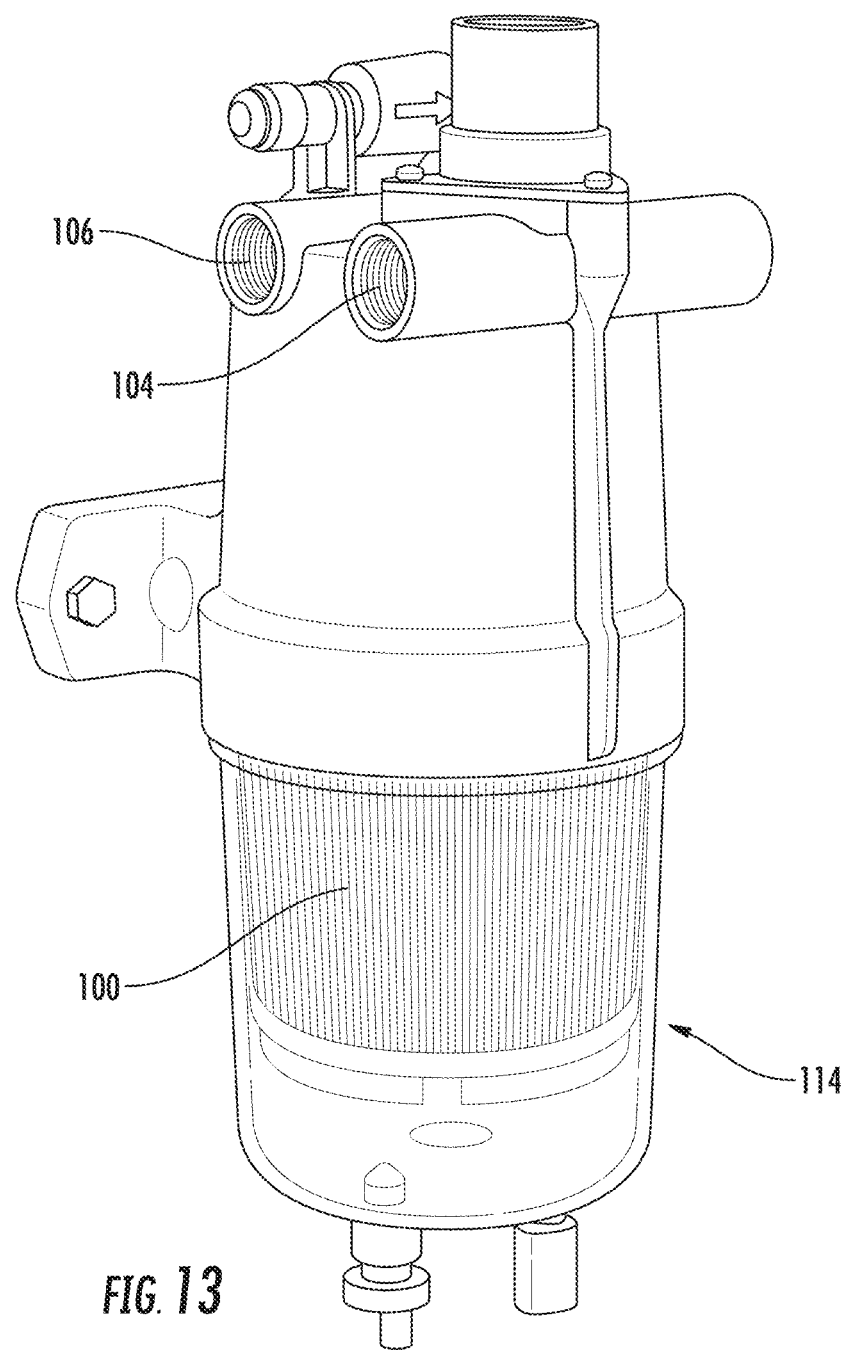
FIG. 13 is a simplified filtration system utilizing a filter element according to FIG. 1 that also includes a filter head and removable collection bowl.

FIG. 13 illustrates a filtration system 115 in which the filter element 100 can have particular applicability. Here, the sump 114 is provided by a removable bowl 117 that is removably connected to a filter head 121. The filter head 121 provides the inlet 104 and outlet 106.

The filter media 102 is one or more layers of filter media that is folded to form a pleated layer of filter media having a plurality of folds 120 that define fold lines that separate adjacent pleat panels 122. The folds 120 interconnect adjacent pairs of pleat panels 122 (also referred to as pleat flanks). In a preferred embodiment, the folds 120 are generally parallel to gravity, illustrated by arrow 124 in FIG. 1.

Preferably, the water sump 114 is at a bottom end 130 of the filter media 102 while the outlet 106 as top end 132 where "top" and "bottom" are defined with reference to gravity. In this way, gravity can be used to force the coalesced water droplets 110 to flow toward the water sump 114 rather than outlet 106.

As noted, the filter media 102 is preferably formed from pleated media with a plurality of pleat panels 122 separated by pleat folds 120.

Figure 2:
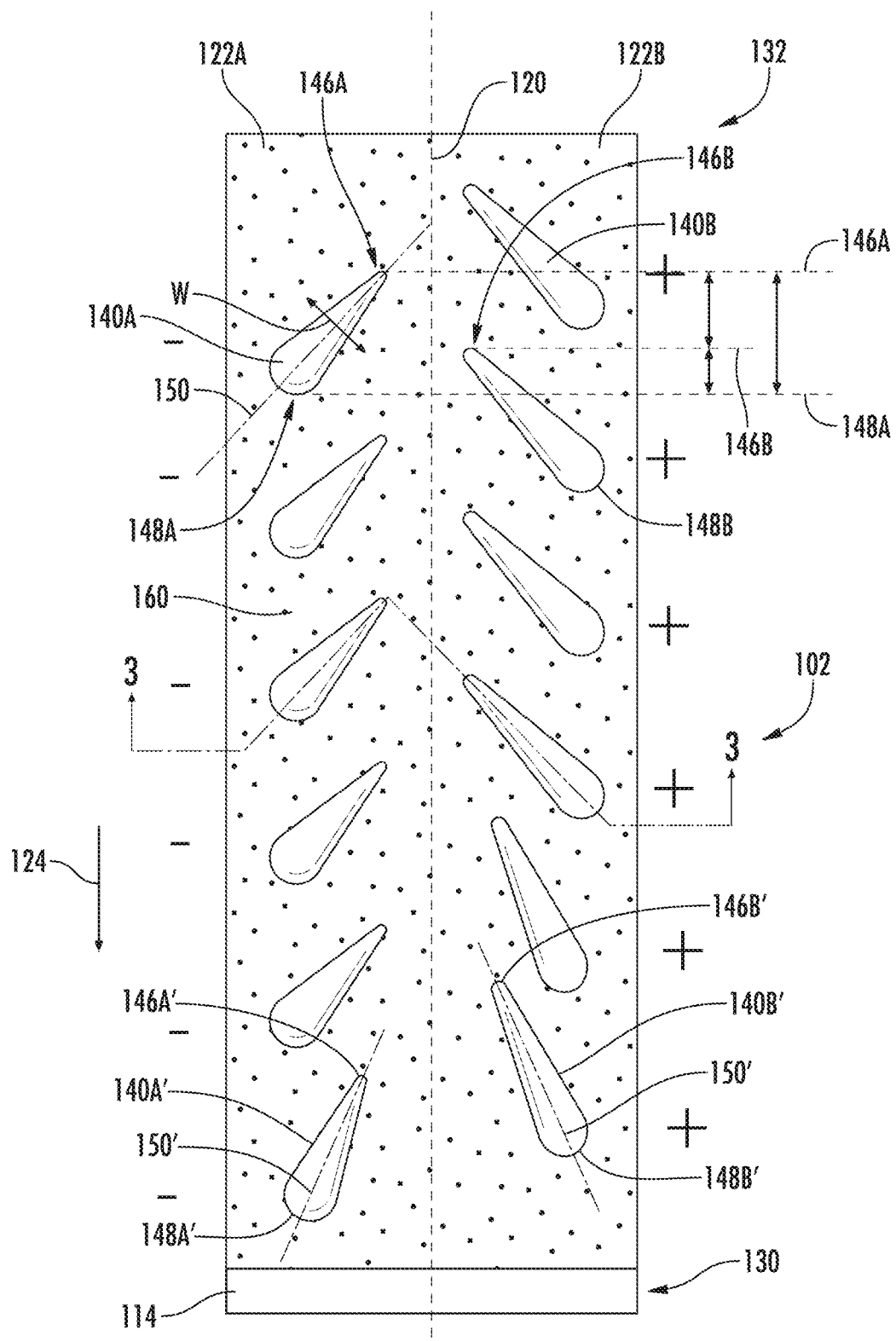
FIG. 2 is a simplified illustration of a pair of pleat panels after being pressed but prior to being folded (e.g. pleated) for use in the filter media of the filter element of FIG. 1.

FIG. 2 is a top view of a pair of pleat panels 122A, 122B prior to being folded about fold line 120 that, in this embodiment, is provided by a score line during the manufacturing process. The fold 120 separates pleat panel 122A from pleat panel 122B, but also interconnects the two adjacent pleat panels 122A, 122B.

In tubular filter elements, such as in FIG. 1, the pleat folds 120 (which may be provided by score lines prior to folding) include radially outer pleat folds 120A and radially inner pleat folds 120B (e.g. the radially outer pleat folds 120A may be referred to as upstream pleat folds and the radially inner pleat folds 120B may referred to as downstream pleat folds with a radially outward to inward fluid flow as illustrated by arrow 104 in FIG. 1). The pleat panels 122 would generally extend radially (typically at a slight angle from perfectly radially) between the outer and inner pleat folds 120A, 120B. The outer pleat folds 120A can be considered to form a radially outer periphery or upstream face (illustrated by dashed line 119A) of the tube of filter media while the inner pleat folds 120B form a radially inner periphery or downstream face (illustrated by dashed line 119B) of the tube of filter media.

In a panel filter element, pleat folds 120A would form an upstream face of the panel filter while pleat folds 120B would form a downstream face of the panel filter element. The pleat panels 122 would extend generally between the upstream and downstream faces.

With reference to FIG. 2, the filter media also includes a plurality of structural embossments 140A, 140B. Structural embossments 140A are formed in pleat panel 122A while structural embossments 140B are formed in pleat panel 122B.

FIG. 2 illustrates an upstream surface 142 (see also FIG. 3) of two pleat panels 122A, 122B of the filter media 102 prior to folding about fold line 120, which is opposite a downstream surface 144. In operation, dirty fluid will first contact upstream surface 142 and then pass through filter media 102 with cleaned fluid exiting the filter media 102 through downstream surface 144.

The filter media has a plurality of manipulations according to embodiments of the application. The first manipulation is the formation of the pleat fold 120, which could be a score or crease.

Figure 3:
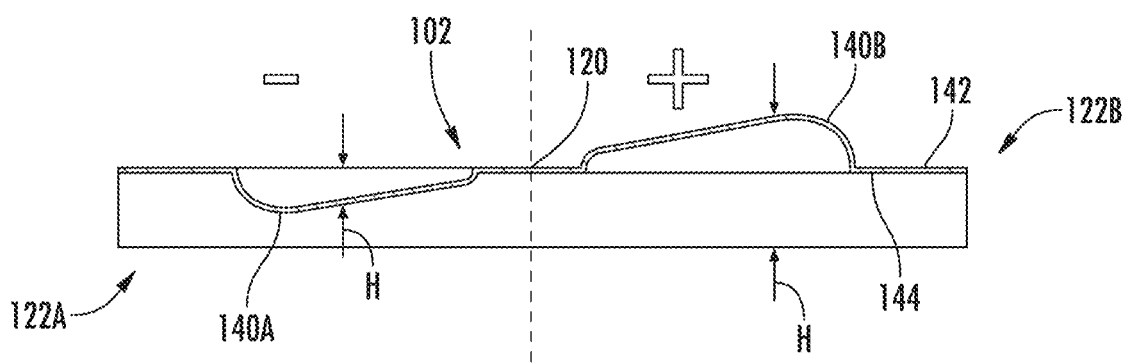
FIG. 3 is a simplified cross-sectional illustration of FIG. 2 taken about line 3-3.

A second manipulation is the formation of the structural embossments 140A, 140B. With reference to FIGS. 2 and 3, in this embodiment, embossments 140A are negative embossments as they form a plurality of depressions in the upstream surface 142 and a plurality of protrusions in the downstream surface 144 of the filter media 102. Embossments 140B are positive embossments as they form a plurality of protrusions in the upstream surface 142 and a plurality of depressions in the downstream surface 144.

While this embodiment illustrates the embossments from alternating pleat panels 122 alternating between positive and negative embossments, in some embodiments, all the embossments could be positive or all of the embossments could be negative. Further, in some embodiments, a single pleat panel 122 could have both positive and negative embossments.

Each of the embossments 140 includes a first end 146 and second end 148. The embossments 140 extend longitudinally between the first and second ends 146, 148 along an embossment axis 150.

In the illustrated embodiment of FIG. 2, the embossments taper between the first and second ends 146, 148. In particular, the width W (illustrated by a double headed arrow in FIG. 2) of the embossments 140 perpendicular to embossment axis 150 increases when moving from the first end 146 toward the second end 148. This results in a tear-dropped shape. In other embodiments, the width can remain constant and need not increase when moving radially inward.

At least a portion of each embossment 140 has width W that is at least double the thickness of the filter media and preferably at least 3 times the thickness of the filter media. In some embodiments, at least a portion of some or all of the embossments has a width W that is at least 4 times the thickness of the filter media.

In some implementations, the height H of the embossments 140 increases when moving along the embossment axis 150 from one end to the other end of the embossment. As illustrated in FIG. 3, the height H increases when moving along the embossment axis 150 away from fold 120. While described in terms of height H, the depth of negative embossments can have a similar orientation. At least a portion of each embossment 140 has height H that is at least double the thickness of the filter media and preferably at least 3 times the thickness of the filter media. In some embodiments, at least a portion of some or all of the embossments has a height H that is at least 4 times the thickness of the filter media.

In some embodiments, the pleat panels 122 would be folded relative to one another about fold 120 such that the second ends 148 of the embossments 140 would be positioned radially closer to the central axis 150 of the tube of filter media 102. In a flat panel filter, the embossments 140 would generally get wider when traveling from an upstream face toward a downstream face of the panel (e.g. in the direction of flow through the filter media panel. However, in other embodiments, the orientation of the first and second ends 146, 148 could be switched such that the second ends 138 of the embossments 140 would be positioned radially farther from the central axis 150 of the tube of filter media 102 than the first ends 146.

This angled orientation helps coalesce entrained water as the dirty fluid flows across the upstream face 142 of the filter media 102 and particularly the embossments 140. The embossments also help maintain spacing between the adjacent pleat panels 122A, 122B once folded.

With reference to FIG. 2, in addition to tapering, in some embodiments, the embossment axis 150 extends at a non-parallel, non-perpendicular orientation relative to the folds 120 and gravity 124. Preferably, the non-parallel, non-perpendicular orientation creates a shingled pattern when viewed in the radial direction, which helps reject more water drop 110 from entering the media.

Figure 14:
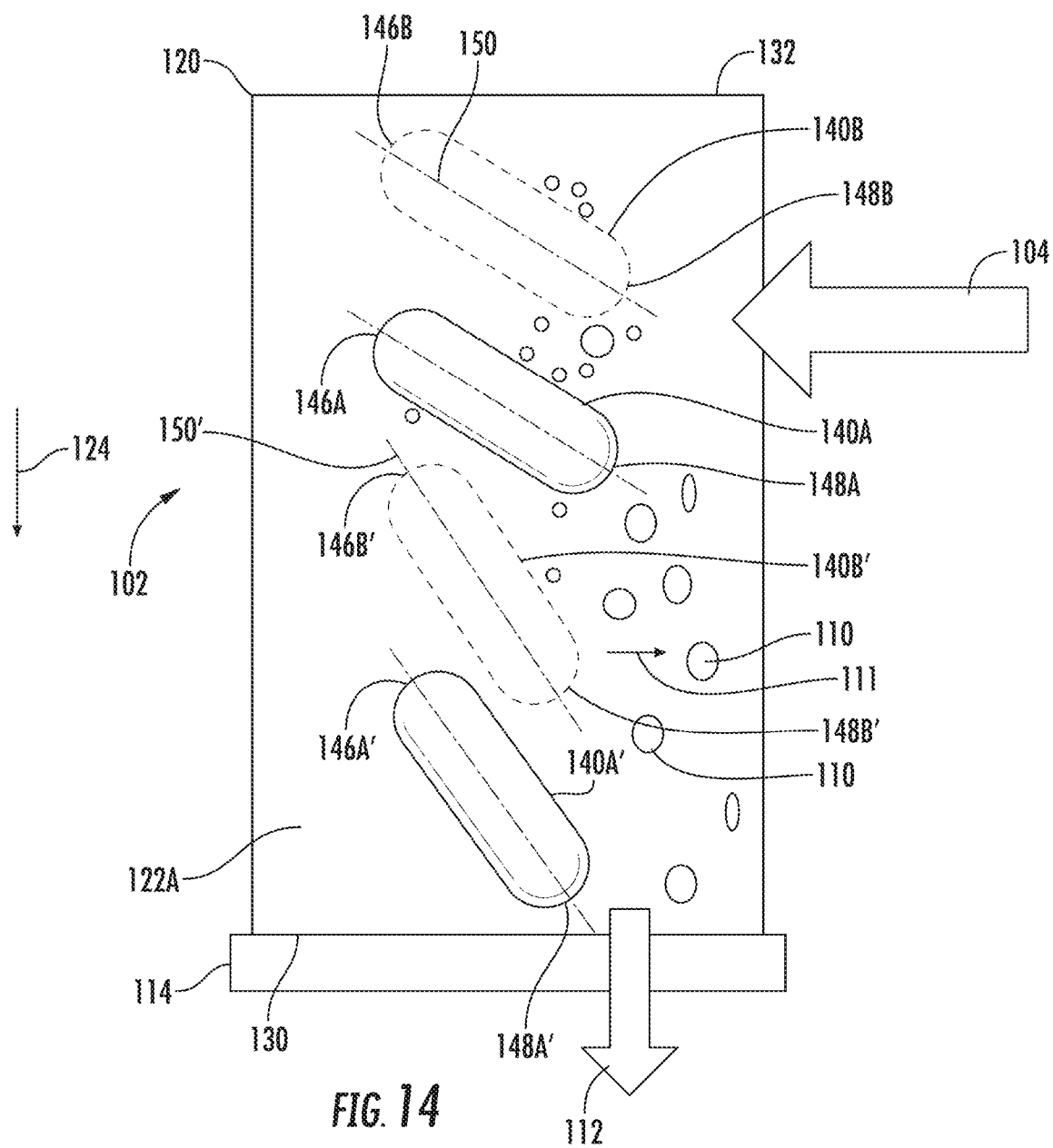
FIG. 14 is a simplified schematic illustration of the flow of fluid to be filtered through a section of filter media formed according to the present application as well as the flow of water separated from the fluid.

FIG. 14 is a simplified illustration of filter media 102 better illustrating the shingled orientation.

In a preferred configuration, the orientation of the embossment axis 150 from one embossment 140 to the next embossment 140 changes when transitioning from the top end 132 towards the bottom end 130. In particular, the orientation of vertically lower embossments 140 is steeper relative to the radial direction and closer to parallel to the pleat folds 120 and gravity 124 the closer the corresponding embossment 140 is located relative to bottom end 130.

The different angles of the embossment axes 150 from one embossment to the next is further illustrated in FIG. 14. Here, the embossment axes 150' of the two lower embossments 140A' and 140B' are steeper than the embossment axes 150 of the two upper embossments 140A and 140B. Notably, embossments 140B, 140B' are shown in dashed lines as they are formed in a pleat panel that is hidden behind the pleat panel that forms embossments 140A, 140A'.

It is also noted that the embossments 140 of FIG. 14 are not teardrop shaped and are instead oval, which is an alternative shape.

The increasing steepness when moving toward the bottom 130 increases the water blocking effect of the embossments 140. This blocks the water droplets 110 from entering the upstream pleated section of the filter media resulting in overall utilization of the surface area for filtration and better performance of the bottom section of the filter element 100. This is particularly beneficial as the separated water droplets 110 move vertically downward toward the bottom end 130 and sump 114. The increased water blocking performance helps compensate for the fact that the downward flow of the water 112 results in the bottom portions of the filter element 100 having a high water concentration before the water is collected in sump 114. The increasing angle of the embossment axes 150' as compared to embossment axes 150 increases the water blocking performance of the lower portion of the filter media 102.

In preferred embodiments, the embossments 140A of pleat panel 122A overlap with embossments 140B of pleat panel 122A when viewed perpendicular to the folds 120. As such, the first end of an embossment 140B is positioned vertically between the first ends of two adjacent embossments 140A. However, it is preferred that the first end of an embossment 140A is positioned vertically between the first and second ends 146, 148 of an embossment 140B.

The angle of the embossment axis 150 relative to the flow of fluid through the media 102 (e.g. the generally radial direction) helps prevent the push through of coalesced water droplets by blocking the re-introduction into the media 102 and also uses gravity to assist with water separation.

As illustrated in FIG. 14, in one embodiment, the embossment axes 150 are angled relative to fold 120 and gravity such that when moving in the fluid flow direction, the embossment axes 150 move toward the top 132. This orientation causes the water droplets 110 to move radially outward (illustrated by arrow 111), as the droplets 110 move vertically downward due to gravity 124. This further promotes removal of the water from the fluid being filtered. With reference to FIG. 13, the water droplets would move outward towards the vertical wall of the bowl 117. However, the reverse orientation could be implemented.

Adjacent the plurality of embossments 140A, 140B 144, the filter media 102 has a plurality of flat surface regions 160.

Preferrably, the structural embossments 140A of one pleat panel 122A are axially offset from the structural embossments 140B of the adjacent pleat panels 122B along the fold 120 such that when the panels 122A, 122B are folded relative to one another about fold 120, the embossments 140B are positioned axially between embossments 140A along fold 120. This allows embossments 140B to cooperate with and/or align with the flat surface regions 160 of the adjacent pleat panel 122A, 122B. This helps maintain appropriate spacing between the pleat panels 122A, 122B.

In a preferred embodiment, these surface regions 160 have been manipulated to have increased surface roughness. More particularly, the filter media 102 is generally formed with a first surface roughness and then the user manipulates the filter media 102, and particularly in these flat surface regions 160 to increase the surface roughness.

In one embodiment, the surface roughness of the upstream surface is at least 116μ, which is equivalent to that of 120 grit sand paper and more preferably at least 190μ which is equivalent to that of 80 grit sand paper and even more preferably at least 425μ, which is equivalent to 40 grit sand paper.

In one embodiment, the surface regions 160 have, after manipulation, a surface roughness of at least 116μ and more preferably at least 425μ. It should be noted that in some preferred embodiments, the embossments 140 have a height of at least three times greater than the surface roughness.

In some embodiments, the surface roughness of the filter media after being manipulated is increased by at least 50% more preferably by at least 100% and even more preferably by at least 400%.

In some embodiments, the surface roughness of the upstream surface 142 is greater than the surface roughness of downstream surface 144. Typically, but not always, the surface roughness of only the upstream surface 142 is manipulated as this is the surface that is first contacted by the dirty fluid that has the entrained water. The surface roughness helps increase the surface energy of the upstream surface 142 and thus the water separation capabilities thereof.

In FIG. 2, the increased surface roughness is illustrated schematically by dotted stippling on the surface of the filter media 102. This roughness may be referred to as micro roughness.

Figure 4:
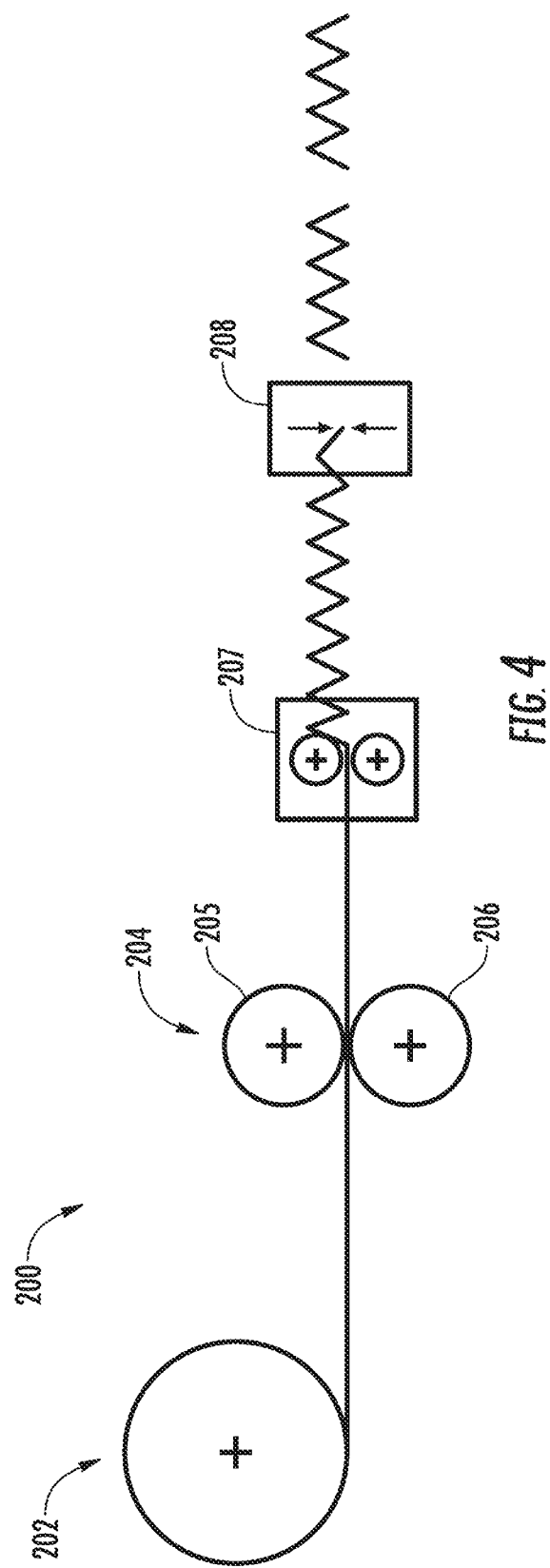
FIG. 4 is a simplified schematic illustration of a system for manipulating the filter media to form a pleated arrangement including structural embossments and increased surface roughness.

FIG. 4 illustrates a simplified filter media processing system 200. The system includes a filter media supply 202, which is typically a roll of filter media that will be used to form filter media 102. The filter media is unwound from the roll and subsequently processed.

Downstream from the filter media supply 202 is a media manipulation station 204 that includes one or more media manipulation tools 205, 206 that performs surface manipulation to one or more surfaces and/or regions of the filter media.

In a particular implementation, the media manipulation station 204 include media manipulation tools in the form of opposed compression rollers. In another implementation, the media manipulation tools are provided by a pair of opposed belts. In a further implementation, the media manipulation tools are provided by a pair of linearly actuated stamping plates that move toward and away from one another along an axis that is generally perpendicular to the flow media through the media manipulation station 204.

In one implementation, the media manipulation station 204 only manipulates one side of the filter media, and particularly the side of the filter media that would become upstream surface 142 described above. In such an embodiment, the media manipulation tool 205, 206 that cooperates with that side of the media would manipulate the surface roughness of the corresponding surface of the filter media to increase the surface roughness as compared to an original surface roughness of the filter media.

Preferably, the media manipulation station 204 modifies the surface roughness without removing any or substantially any of the filter media, e.g. without abrading or laser etching of the media. Instead, it is preferred to modify the surface roughness simply by compressing the filter media. Removal methods can, among other things, leave debris on the filter media.

In one implementation, the media manipulation tool 205, 206 that defines the desired surface roughness is formed from a material that is more rigid than the other one of the media manipulation tools 205, 206. In some implementation, the media manipulation tools 205, 206 may have the surface roughness profile laser etched into the surface of the tooling.

In one embodiment, the same media manipulation tool 205 or 206 has both the structural embossment and surface roughness features formed therein. In some embodiments, the media manipulation tool 205, 206 is entirely free of surface roughness features and only provides the structural embossments.

In some implementations, the media manipulation tool 205, 206 has a rigid member that provides the structural embossment profiles formed therein and a micro-roughness film is attached to the rigid member. The micro-roughness film would surround the structural embossment profiles.

In some implementations, the media manipulation station 204 has a two-step process where the roughness and structural embossments are formed using separate sets of tooling that are aligned sequentially such that one process is performed first and then the other process is performed. Typically, the roughness process would occur first. Again, other systems may have only one of the various different media manipulation features.

In some implementations, structural embossments do not have the surface thereof manipulated to increase roughness and only the remainder portion of the pleat panel (e.g. substantially planar portions of the filter media) are manipulated to provide improved surface roughness.

In a preferred implementation, the media manipulation tools 205, 206 have both a positive and negative structural embossment feature that align to form a single structural embossment. For example, a projection of tool 205 would align with and press filter media into a corresponding recess of cooperating tool 206 to form an embossment. However, while cooperating projection/recess features (e.g. cooperating positive and negative features) may preferably be used to form the structural embossments, the surface roughness features will typically not be formed with such a positive/negative arrangement. Instead, the surface roughness features would be formed simply by one or the other tool 205, 206 without cooperating features between tools 205, 206 that cooperate to form the surface roughness.

In one implementation, the filter media is a laminate of a plurality of layers of filter media. This laminate is formed and the layers thereof are secured to one another prior to passing through the media manipulation station 204.

Further, it is preferred that the surfaces that have had the surface roughness enhanced and increased, it is preferred that these surfaces are not subsequently coated. This is particularly true because the surface roughness added to the filter media is not used as a means for securing separate layers together. Instead, the surface roughness should remain unencumbered by other material such that the improved water separation features remain.

Downstream from tool 205, 206 is a folder 207 that causes the adjacent pleat panels 122 to be folded about the corresponding pleat folds 120

Figure 5:
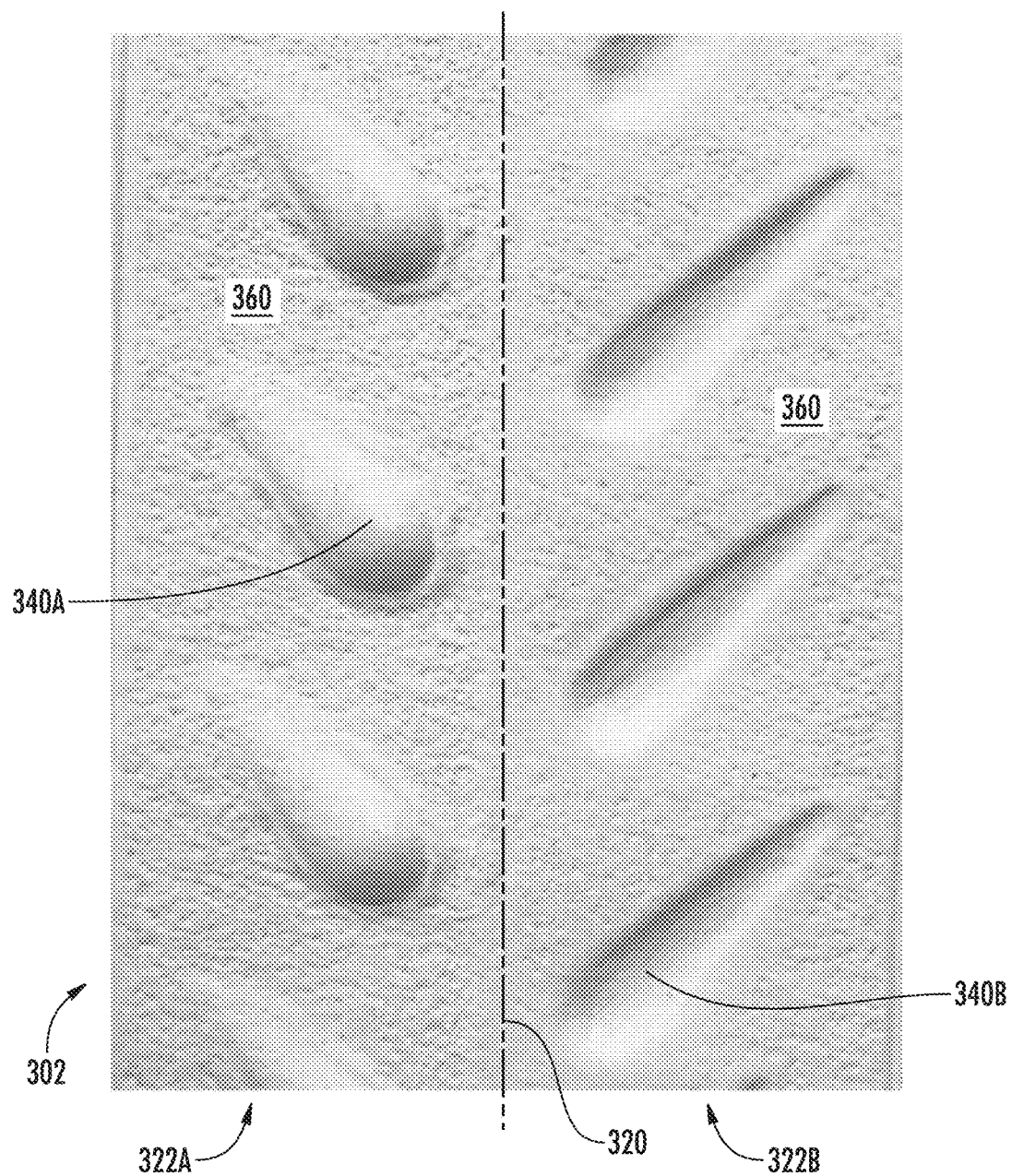
FIG. 5 is a photograph of filter media prior to being pleated according to an implementation of the application including structural embossments and optional enhanced surface roughness.

FIG. 5 is a photograph of filter media 302 that has been manipulated to include a fold 320 to define pleat panes 322A, 322B, structural embossments 340A, 340B and flat surface regions 360 with enhanced roughness.

Figure 6:
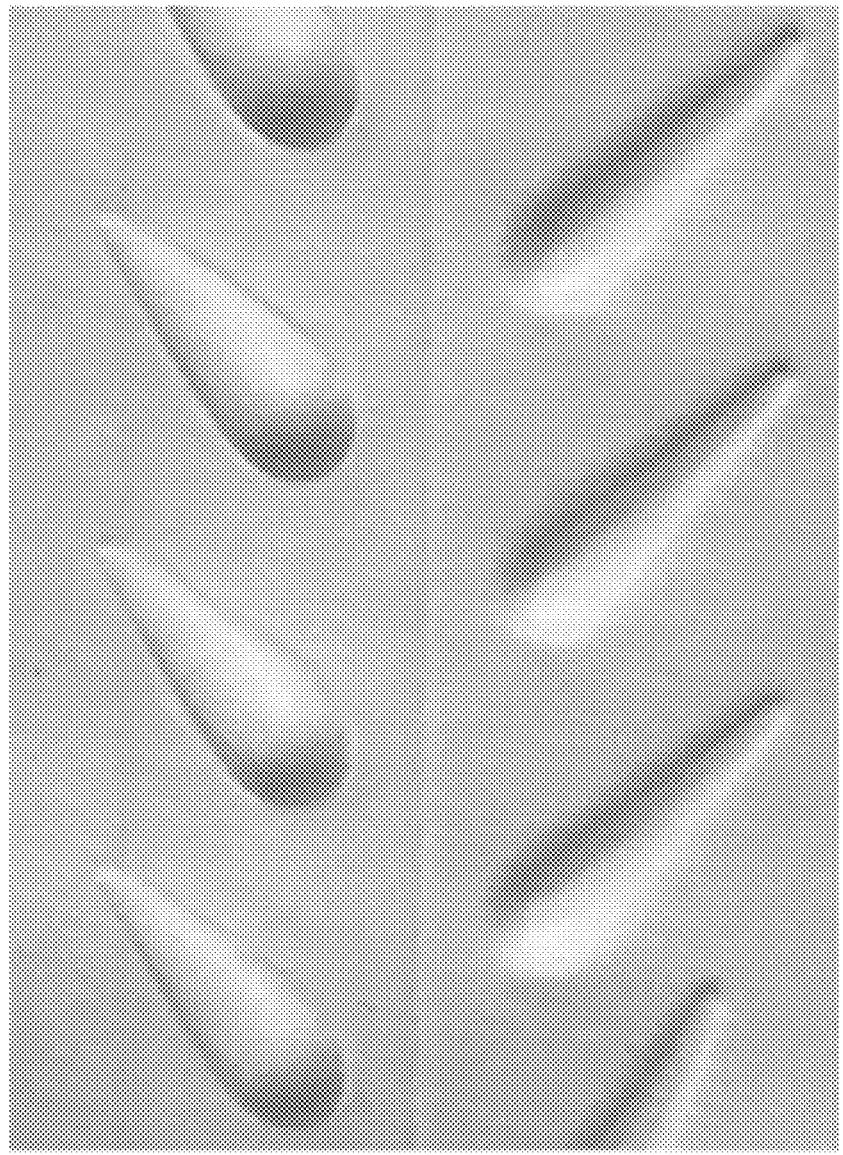
FIG. 6 is a photograph of filter media prior to being pleated (e.g. folded) according to an implementation of the application including structural embossments but without optional increased surface roughness.

FIG. 6 is a photograph similar to FIG. 5. However, the filter media did not include the enhanced surface roughness surrounding the structural embossments.

Figure 7:
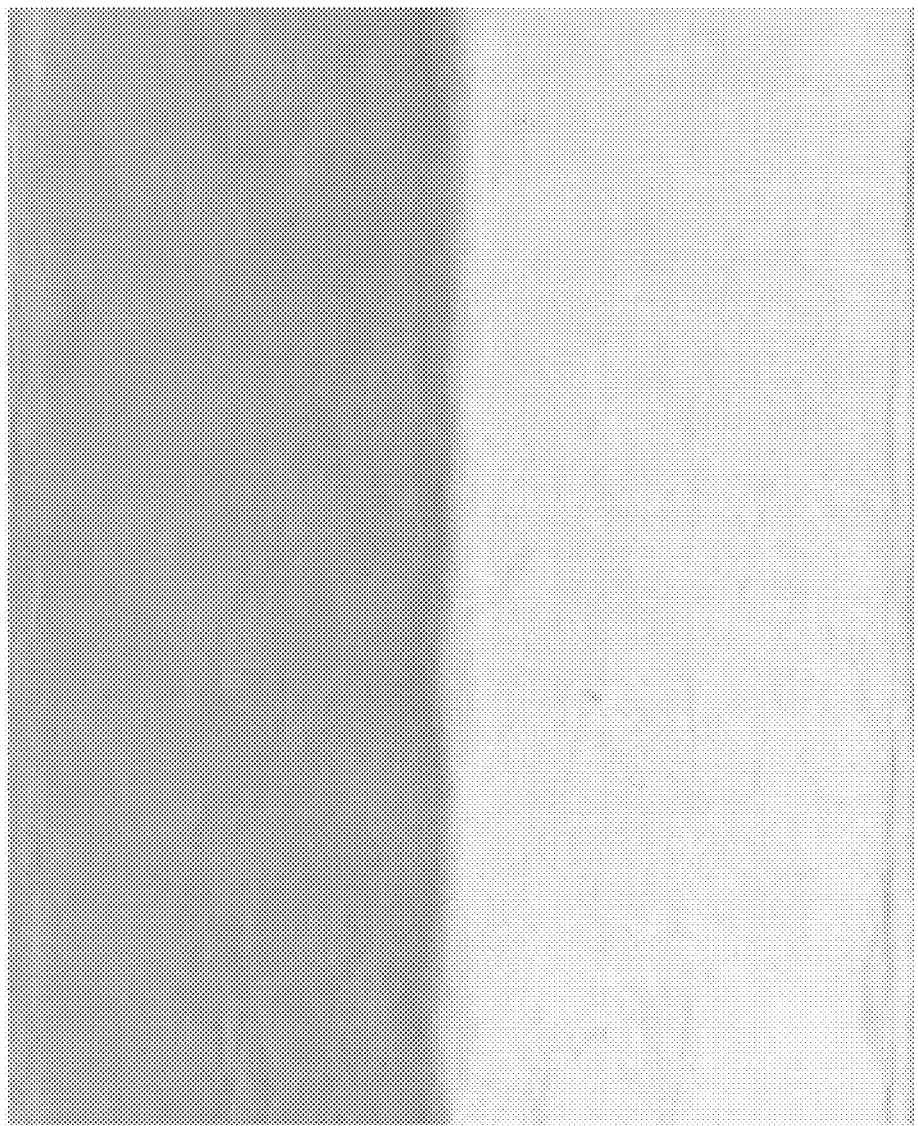
FIG. 7 is a photograph of a control sample of filter media that does not include enhanced surface roughness or embossments that was used for the filter media of FIGS. 5 and 6.

FIG. 7 is a photograph of an unmanipulated sample of the filter media used for the arrangements of FIGS. 5 and 6.

The Applicants have performed various tests to compare the operational parameters of filter media of all three arrangements of FIGS. 5-7. However, not all tests were performed on the sample that did not include surface roughness.

Figure 8:
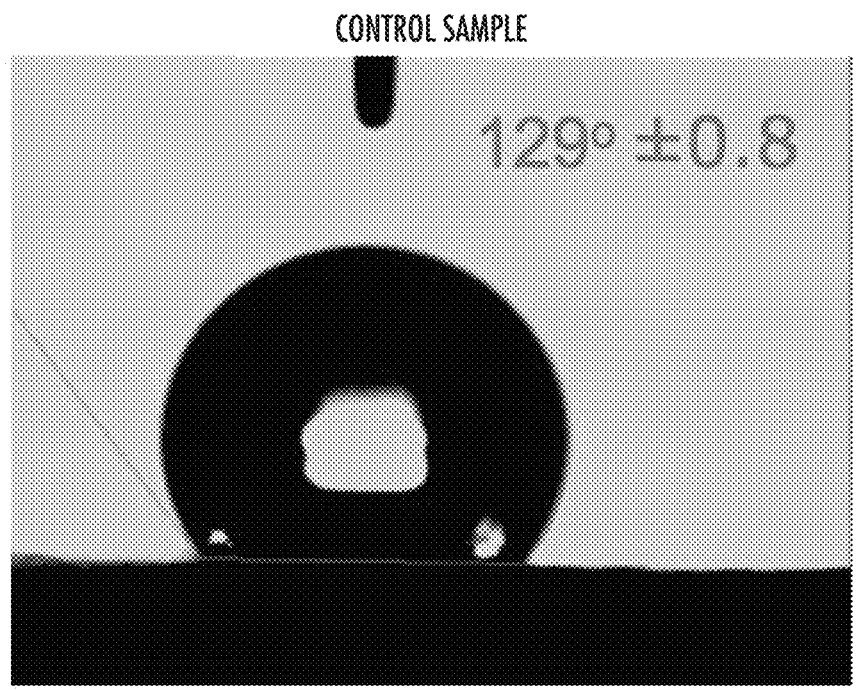
FIG. 8 is an image of the contact angle of a water droplet on the control sample of filter media of FIG. 7.
Figure 9:
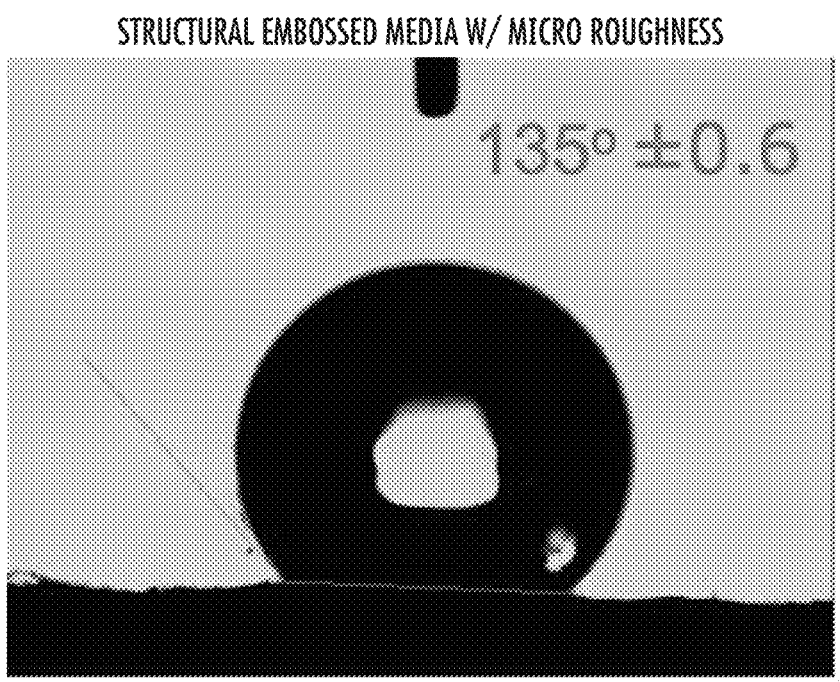
FIG. 9 is an image of the contact angle of a water droplet on the enhanced surface roughness region of the sample of FIG. 5.

FIGS. 8 and 9 compare the contact angle for the control filter media of FIG. 7 and the modified filter media of FIG. 5. The contact angle of water on the surface of the corresponding medias was tested using a Goniometer. It was determined that the sample with the surface roughness increased had a greater contact angle. More particularly, the control sample had an average contact angle of 129° plus or minus 0.8 (average of two values) while the sample with increased surface roughness had an average contact angle of 135° plus or minus 0.6 (average of two values).

Figure 10:
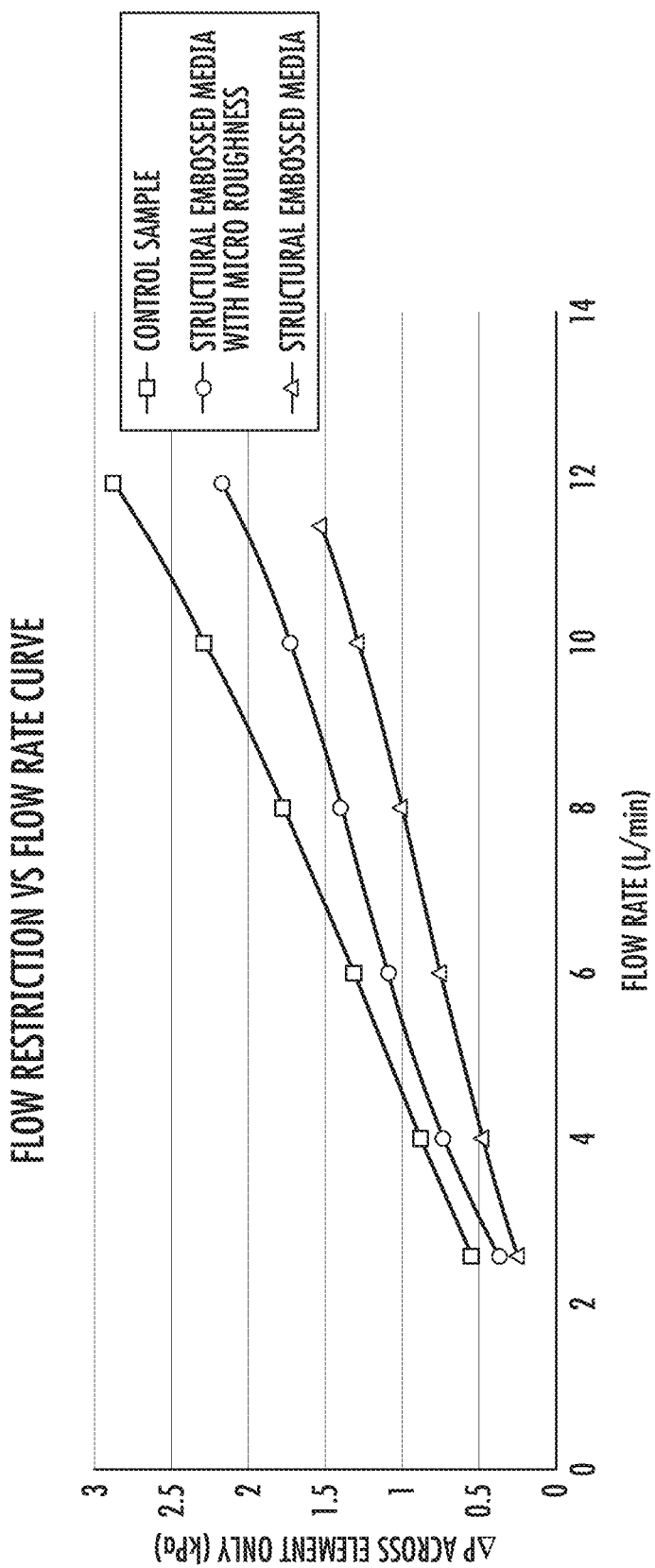
FIGS. 10-12 are test results comparing the samples of FIGS. 5-7.

FIG. 10 illustrates a comparison of the flow restriction vs. flow rate based on SAE J905. The liquid used was ultralow sulfur diesel (ULSD). As illustrated, the modified samples each had reduced pressure drop than the control sample at a same flow rate.

Figure 11:
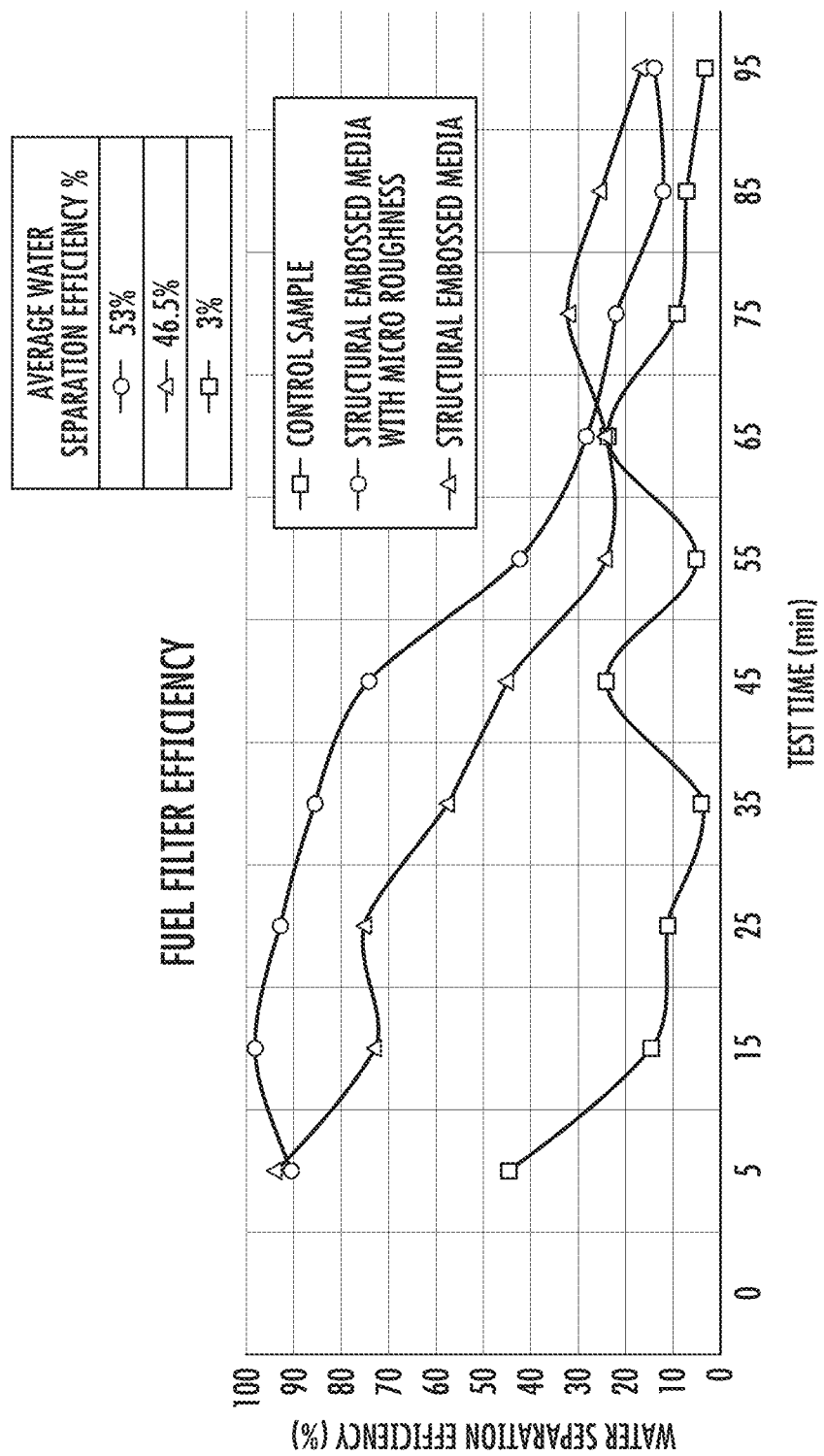

FIG. 11 illustrates a comparison of water separation efficiency over time tested according to SAE J1488. The test flow rate was 1 gpm. The flow was outside-in with a cylindrical filter element.

Figure 12:
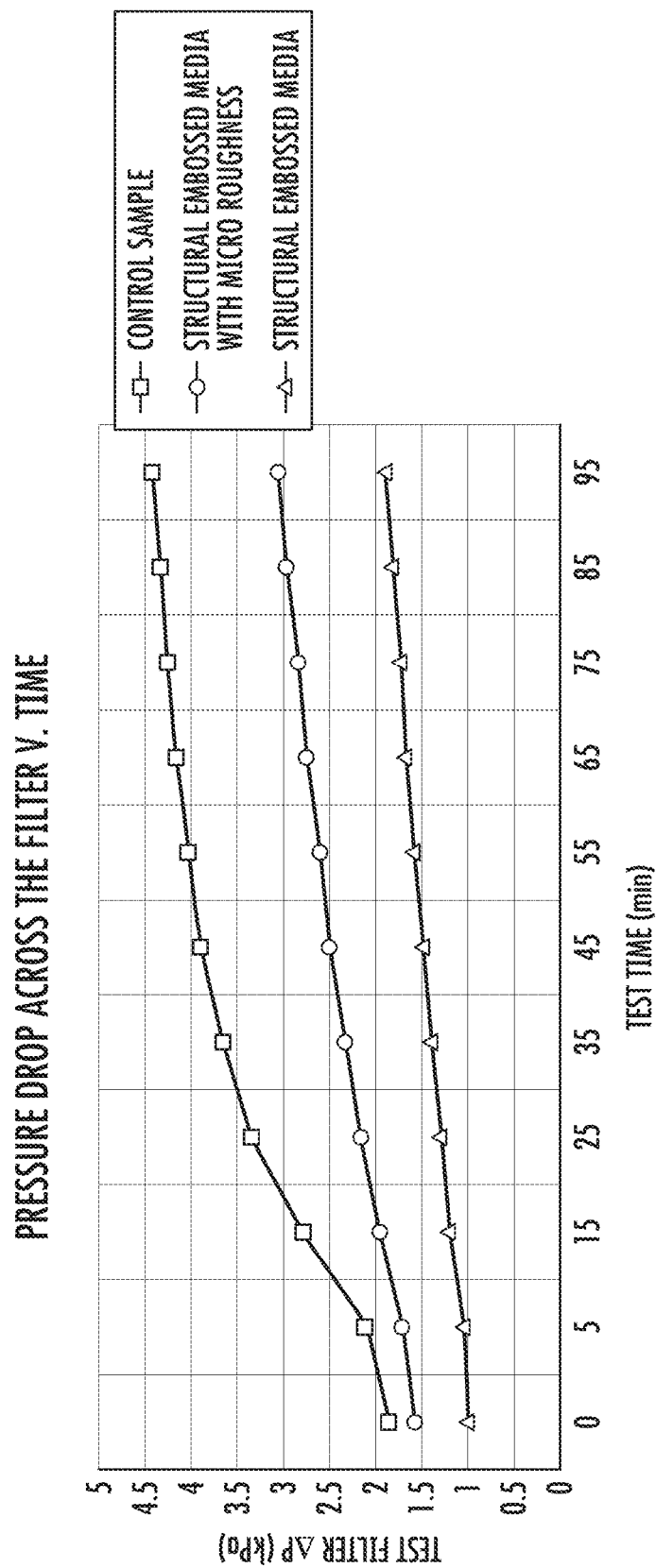

FIG. 12 plots the pressure drop over time for the three samples tested according to SAE J1488. The test flow rate was 1 gpm. The flow was outside-in with a cylindrical filter element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pleated filter element comprising:
   pleated filter media having a first side forming an upstream surface and a second side forming a downstream surface, the pleated filter media including a plurality of pleat flanks and a plurality of folds, adjacent pleat flanks connected by a corresponding one of the plurality of folds; and
   a plurality of structural embossments formed in at least one of the first and second sides of the pleat flanks, each structural embossment having a first end and a second end, the first and second end defining an embossment axis of the structural embossment, the embossment axis extending at a non-parallel and non-perpendicular orientation relative to the folds connected to the corresponding pleat flank;
   wherein:
      a first structural embossment of the plurality of structural embossments and a second structural embossment of the plurality of structural embossments are formed in a first pleat flank of the plurality pleat flanks;
      the embossment axis of the first structural embossment extending at a different angle than the embossment axis of the second structural embossment; and
      the pleated filter media has a gravitational top and a gravitational bottom, the gravitational top being vertically above the gravitational bottom, the folds extending between the gravitational top and the gravitation bottom, the embossment axis of the first structural embossment being less aligned with gravity than the embossment axis of the second structural embossment, the first structural embossment being located closer to the gravitational top than the second structural embossment.

2. The pleated filter element of claim 1, wherein:
   the pleated filter media forms a tube of filter media defining a longitudinal central axis, the folds extend parallel to the longitudinal central axis; and
   each structural embossment is elongated along the structural embossment's embossment axis.

3. The pleated filter element of claim 1, wherein the plurality of structural embossments each have a width that is generally perpendicular to the embossment axis, the width increasing when moving from the first end toward the second end.

4. A pleated filter element comprising:
   pleated filter media having a first side forming an upstream surface and a second side forming a downstream surface, the pleated filter media including a plurality of pleat flanks and a plurality of folds, adjacent pleat flanks connected by a corresponding one of the plurality of folds; and
   a plurality of structural embossments formed in at least one of the first and second sides of the pleat flanks, each structural embossment having a first end and a second end, the first and second end defining an embossment axis of the structural embossment, the embossment axis extending at a non-parallel and non-perpendicular orientation relative to the folds connected to the corresponding pleat flank;
   wherein:
      a first structural embossment of the plurality of structural embossments and a second structural embossment of the plurality of structural embossments are formed in a first pleat flank of the plurality pleat flanks;
      a third structural embossment of the plurality of structural embossments is formed in a second pleat flank of the plurality of pleat flanks, a first fold of the plurality of folds being formed between the first and second pleat flanks, the first end of the third structural embossment being positioned axially between the first ends of the first and second structural embossments along the first fold and the first end of the second structural embossment being positioned axially between the first and second ends of the third structural embossment, the first, second, and third structural embossments forming a shingled orientation;
      the first and second structural embossments form a projection on the first side of the pleated filter media and a depression on the second side of the pleated filter media;
      the third structural embossment forms a projection on the second side of the second pleat flank and a depression on the first side of the second pleat flank.

5. The pleated filter element of claim 1, wherein:
   the filtration media is formed into a tube of pleated filter media defining a central longitudinal axis;
   each of the structural embossments form a projection on one of the first and second sides of the corresponding pleat flank and a depression in the other one of the first and second sides of the corresponding pleat flank;
   wherein a width of the projection and depth of the depression measured generally perpendicular to the corresponding pleat flank increases when moving radially away from the central longitudinal axis of the tube of pleated filter media and along the embossment axis.

6. The pleated filter element of claim 1, wherein:
the pleated filter media is formed into a tube of pleated filter media, the tube of pleated filter media defining a central longitudinal axis, the tube of pleated filter media and is configured for fluid to be filtered to flow radially through the tube of pleated filter media as the fluid is filtered;
the tube of pleated filter media has a gravitational top and a gravitational bottom, the gravitational top being vertically above the gravitational bottom, the central longitudinal axis and folds extending between the gravitational top and the gravitation bottom, the embossment axis of the structural embossments being oriented relative to the longitudinal axis such that when moving along the embossment axis towards the gravitation bottom, the embossment axis moves radially outward and away from the longitudinal axis.

7. A method of making a filter element of claim 1 comprising:
providing filter media;
embossing the filter media with a plurality of structural embossments;
folding the filter media about a plurality of folds to form a plurality of pleat flanks.

8. A method of filtering water from a flow of fuel comprising:
passing the flow of fuel through the filter media of the filter element of claim 1 as the fuel flows from an inlet of the filter element to an outlet of the filter element.

9. A filtration system comprising:
a filter head having an inlet and an outlet;
a housing, the housing defining a sump region;
a filter element according to claim 1 positioned within the housing vertically.

10. A pleated filter element comprising:
pleated filter media having a first side forming an upstream surface and a second side forming a downstream surface, the pleated filter media including a plurality of pleat flanks and a plurality of folds, adjacent pleat flanks connected by a corresponding one of the plurality of folds; and
a plurality of structural embossments formed in at least one of the first and second sides of the pleat flanks, each structural embossment having a first end and a second end, the first and second ends defining an embossment axis of the structural embossment, the embossment axis extending at a non-parallel and non-perpendicular orientation relative to the folds connected to the corresponding pleat flank;
wherein:
a first structural embossment of the plurality of structural embossments and a second structural embossment of the plurality of structural embossments are formed in a first pleat flank of the plurality pleat flanks;
the embossment axis of the first structural embossment extending at a first angle relative to the pleat folds;
the embossment axis of the second structural embossment extending at a second angle relative to the pleat folds;
wherein the first angle and the second angle extend at different angles relative to a same pleat fold, wherein the first and second angles are both less than ninety (90) degrees relative to the same pleat fold when measured in a same angular direction relative to the same pleat fold.

11. The pleated filter element of claim 4, wherein the embossment axis of the first structural embossment extending at a different angle than the embossment axis of the second structural embossment.

12. The pleated filter element of claim 11, wherein the pleated filter media has a gravitational top and a gravitational bottom, the gravitational top being vertically above the gravitational bottom, the folds extending between the gravitational top and the gravitation bottom, the embossment axis of the first structural embossment being less aligned with gravity than the embossment axis of the second structural embossment, the first structural embossment being located closer to the gravitational top than the second structural embossment.

13. The pleated filter element of claim 12, wherein the pleated filter media forms a block of filter media that defines an upstream face and a downstream face, the block of filter media has a flow direction through which fluid to be filtered flows from the upstream face to the downstream face, the flow direction is generally perpendicular to the plurality of folds.

14. The pleated filter element of claim 13, wherein the embossment axes are angled relative to the folds such that when moving in the flow direction from the upstream face towards the downstream face, the embossment axes move upward towards the gravitational top of the pleated filter media.

* * * * *